(12) United States Patent
Schaefers et al.

(10) Patent No.: US 9,193,338 B2
(45) Date of Patent: Nov. 24, 2015

(54) PRESSURE-MEDIUM-ACTIVATED BRAKE DEVICE OF A VEHICLE HAVING CONTROL ROUTINES IMPLEMENTED IN A BRAKE CONTROLLER UNIT, OF A HILL START ASSISTANT FUNCTION OR CREEP SUPPRESSION FUNCTION

(75) Inventors: Andreas Schaefers, Hemmingen (DE); Adnan Mustapha, Maulbronn (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 201 days.

(21) Appl. No.: 13/882,060

(22) PCT Filed: Oct. 26, 2011

(86) PCT No.: PCT/EP2011/068746
§ 371 (c)(1),
(2), (4) Date: May 28, 2013

(87) PCT Pub. No.: WO2012/055911
PCT Pub. Date: May 3, 2012

(65) Prior Publication Data
US 2013/0238209 A1    Sep. 12, 2013

(30) Foreign Application Priority Data

Oct. 29, 2010 (DE) .......... 10 2010 050 101

(51) Int. Cl.
*B60T 8/175* (2006.01)
*B60T 7/12* (2006.01)
(Continued)

(52) U.S. Cl.
CPC .................. *B60T 8/175* (2013.01); *B60T 7/122* (2013.01); *B60T 8/321* (2013.01); *B60T 8/34* (2013.01); *B60T 8/4818* (2013.01); *B60T 13/683* (2013.01); *B60T 2201/06* (2013.01)

(58) Field of Classification Search
CPC . B60T 13/686; B60T 2201/06; B60T 8/4809; B60T 13/683; B60T 8/172; B60T 8/327
USPC ........... 701/22, 70, 81, 90, 94; 303/11, 113.1, 303/113.2, 113.4, 119.1, 125, 14, 146, 15, 303/152, 191, 16
See application file for complete search history.

(56) References Cited

U.S. PATENT DOCUMENTS 4,196,941 A * 4/1980 Goebels ............... 303/119.3
4,819,995 A   4/1989 Löhmann et al.
(Continued)

FOREIGN PATENT DOCUMENTS

CN    1093987    10/1994
DE    43 32 459   3/1995
(Continued)

OTHER PUBLICATIONS

Goebels H J, Pneumatic anti-blocking brake valve has triple solenoid controls and failsafe interlock to maintain braking during system test; published Apr. 8, 1980; see Basic Abstract file name: U.S. Pat. No. 4,196,941_Basic Abstract.pdf.*

(Continued)

*Primary Examiner* — Helal A Algahaim
*Assistant Examiner* — Jelani Smith
(74) *Attorney, Agent, or Firm* — Kenyon & Kenyon LLP

(57) ABSTRACT

A pressure-medium-activated brake device of a vehicle without brake pressure control but with brake slip control (ABS) for driver-independent control of the brake slip during a braking process, and traction control (TCS) for driver-independent control of the drive slip during an acceleration process.

7 Claims, 2 Drawing Sheets

(51) Int. Cl.
  *B60T 8/32* (2006.01)
  *B60T 8/34* (2006.01)
  *B60T 8/48* (2006.01)
  *B60T 13/68* (2006.01)

(56) References Cited

U.S. PATENT DOCUMENTS

| | | | |
|---|---|---|---|
| 6,056,373 | A | 5/2000 | Zechmann et al. |
| 6,439,675 | B1 * | 8/2002 | Zechmann et al. ............ 303/191 |
| 2004/0012252 | A1 * | 1/2004 | Meyer et al. ................ 303/113.2 |
| 2006/0152075 | A1 * | 7/2006 | Goebels et al. ............ 303/119.1 |
| 2008/0071459 | A1 * | 3/2008 | Sokoll et al. .................... 701/81 |
| 2008/0136249 | A1 * | 6/2008 | Park et al. .................... 303/9.75 |
| 2010/0301667 | A1 * | 12/2010 | Yamamoto et al. ................ 303/5 |

FOREIGN PATENT DOCUMENTS

| | | |
|---|---|---|
| DE | 196 25 919 | 1/1998 |
| DE | 10 2008 007709 | 8/2009 |
| EP | 0 274 610 | 7/1988 |
| EP | 0 604 864 | 7/1994 |
| EP | 1 008 503 | 6/2000 |
| EP | 1612114 | 4/2007 |
| GB | 2 201 743 | 9/1988 |
| WO | 03/043863 | 5/2003 |
| WO | WO 2009068954 A1 * | 6/2009 |
| WO | 2009152957 | 12/2009 |

OTHER PUBLICATIONS

European Patent Office, International Preliminary Report on Patentability, Apr. 30, 2013, from International Patent Application No. PCT/EP2011/068746, filed on Oct. 26, 2011.

European Patent Office, English Translation of International Preliminary Report on Patentability, Apr. 30, 2013, from International Patent Application No. PCT/EP2011/068746, filed on Oct. 26, 2011.

International Search Report for PCT/EP2011/068746, dated Oct. 26, 2011.

* cited by examiner

PRESSURE-MEDIUM-ACTIVATED BRAKE DEVICE OF A VEHICLE HAVING CONTROL ROUTINES IMPLEMENTED IN A BRAKE CONTROLLER UNIT, OF A HILL START ASSISTANT FUNCTION OR CREEP SUPPRESSION FUNCTION

FIELD OF THE INVENTION

The present invention relates to a pressure-medium-activated brake device of a vehicle without brake pressure control but with brake slip control (ABS) for driver-independent control of the brake slip during a braking process, and traction control (TCS) for driver-independent control of the drive slip during an acceleration process.

BACKGROUND INFORMATION

When a vehicle with automatic transmission has stopped, it must be held by the driver using the brake, since when drive is engaged, because of the converter, the vehicle has a tendency to move forward slowly (creep). The load on the driver can be relieved in that once the necessary braking effect, generally the brake pressure, has been applied, it is held substantially constant. This can be achieved for example in that the brake pressure initiated by the driver is blocked in the wheel by a valve between the brake master cylinder and the wheel brake cylinder as soon as the vehicle has stopped.

For this a vehicle speed sensor detects the vehicle stoppage. The driver can then remove his foot from the brake while the wheels remain braked. The brake pressure in the wheels is dissipated as soon as the driver activates the gas pedal and hence signals his wish to move away. Such a system for creep suppression is known for example from DE-OS 43 32459.

Starting a vehicle with manual transmission on a hill is a complex process which requires the combined use of drive and clutch pedals in cooperation with operation of the handbrake. The difficulty lies in metering the braking effect or brake moment during the start-up process so that the vehicle does not roll in the wrong direction until the drive moment transmitted via the manual transmission is sufficient for the actual start. There are many proposals for relieving the load on the driver in this situation. In vehicles with hydraulic brake systems for example the wheel brake pressure can be separated from the master brake cylinder pressure via a control valve. The brake pressure once applied by the driver is thus maintained at the wheels even if the driver no longer operates the brake pedal. This process is activated with a special switch. The driver can now initiate the starting process without having to worry about the brake. The control valve is opened as soon as a vehicle movement is detected via a change in the rotary position of the drive shaft. Reference is made to DE-OS 38 32 025 for such starting aids ("hillholder").

A generic pressure-medium-activated brake device with creep suppression and hill start assistant (hillholder) function is discussed for example in DE 196 25 919 A1. There, to sense the activation conditions for the operating mode "creep suppression" or "hillholder", only those signals are used which are present in any case in vehicles with an ABS and/or TCS system. The creep suppression or starting aid functions can then be integrated in an ABS/TCS system with no additional sensors. The control routines for the creep suppression and hill start (hillholder) functions are each implemented, according to FIGS. 2a and 2b of this publication, in a separate control unit (reference numerals 204a and 204b). Furthermore as well as the brake pressure build-up valves and brake pressure reduction valves (reference numerals 19 or 20), which during wheel slip regulation mode are controlled by a control unit (not shown explicitly there), switchover valves USV1 and USV2 are present which are provided merely to implement the creep suppression and hill start function (hillholder).

SUMMARY OF THE INVENTION

The present invention is based on the object of refining a brake device of the type cited initially such that it can be produced more easily and more economically.

This object may be achieved according to the invention by the features described herein.

In particular, the invention is based on a pressure-medium-activated brake device of a vehicle without brake pressure control but with brake slip control (ABS) for driver-independent control of the brake slip during a braking process, and with traction control (TCS) for driver-independent control of the drive slip during an acceleration process, wherein as part of the brake slip control (ABS) at least one ABS pressure control valve (PCV) controlled by a brake controller unit is connected in pressure lines running between a service brake valve and at least one brake cylinder to increase, maintain and reduce the pressure in the allocated brake cylinder, and as part of the traction control (TCS) at least one TCS valve (TCV) controlled by the brake controller unit is provided to create a compressed air connection between a pressure medium store and the at least one ABS pressure control valve (PCV), and with a hill start assistant and/or creep suppression function controlled by control routines, as part of which the brake pressure generated by the driver during a preceding braking in at least some brake cylinders of the vehicle, on a detected stoppage of the vehicle on a hill or detected creep of the vehicle, is at least maintained in the at least one brake cylinder without the driver having to activate the brake further, according to the description herein.

According to the present invention, it is proposed that the control routines for the hill start assistant and creep suppression function are implemented in the brake controller unit and that the brake controller unit is adapted such that to implement the hill start assistant and creep suppression function, it controls exclusively the ABS pressure control valves and the at least one TCS valve.

In this case therefore all routines affecting the vehicle operating brakes for service braking with and without ABS, the TCS function and the hill start assistant and/or the creep suppression function, are integrated in a single brake controller unit which in the prior art controls merely the service brake, ABS and TCS functions. Thus the complexity of hardware and wiring or piping is reduced.

In particular all said functions can be implemented in a conventional pressure-medium-activated brake device with only ABS and TCS function scope, without having to provide further valves, wiring or piping, because the valves present in any case for the ABS/TCS functions are used at the same time to implement the hill start assistant and/or creep suppression functions. No further valves or actuators are thus required.

Not least, there is no need to extend the brake device as an electronically regulated brake system (EBS) in order to be able to implement said hill start assistant or creep suppression functions, which has a favorable effect on the cost of such a system. These electronically regulated brake systems (EBS) which are not required for the invention usually comprise pressure control modules (DRM) which convert the electronically set nominal brake pressures into pneumatic pressures. For this a pressure control module comprises a separate control unit and usually a combined inlet and outlet valve, which control a relay valve. An integrated pressure sensor measures the output brake pressure and reports it to the control unit to regulate out the pressure deviation. Such an electronically regulated brake system (EBS) is therefore relatively complex.

The brake device according to the invention in comparison is configured without brake pressure control i.e. in the case of a pneumatic brake device, it has no electronically regulated brake system (EBS) with pressure control modules but is a conventional pressure-medium-activated brake device with merely ABS and TCS function.

The measures listed in herein constitute advantageous refinements and improvements of the invention described herein.

According to a particular embodiment, in the case of an activated operating mode "hill start assistant and/or creep suppression function" and with the brakes released, the at least one ABS valve and the TCS valve are controlled by the brake controller unit such that the at least one ABS pressure control valve is switched into a pressure-retention position in which the greatest brake pressure generated by the preceding braking in the at least one brake cylinder is maintained, and the at least one TCS valve is switched to a position in which it connects the at least one ABS pressure control valve on the input side with the pressure medium store. The latter is necessary because ABS pressure control valves are found from experience to be unable to maintain for a long period the brake pressure applied in the course of a preceding brake application, so that further pressure medium must be supplied from the brake medium store, which then takes place via the correspondingly switched TCS valve.

Furthermore, at least one longitudinal acceleration sensor may be provided which emits longitudinal acceleration signals to the brake controller unit, wherein the operating mode "hill start assistant and/or creep suppression function" is activated by the brake controller unit when the longitudinal acceleration measured exceeds a lower limit value, and signals which represent a stoppage of the vehicle are still being sent to the brake controller unit. When the longitudinal acceleration signal exceeds such a lower limit value, this indicates that the vehicle has been braked to a stoppage on an uphill or downhill slope, because then a certain longitudinal acceleration is still detectable which is caused by the downward slip force acting on the vehicle.

The stoppage of the vehicle may be detected by signals from the wheel rotation speed sensors allocated to the ABS function and/or the TCS function, which are in any case present or required as part of the well-known ABS and TCS functions.

In addition for example at least one pressure sensor is connected in a pressure path between the service brake valve and the at least one ABS pressure control valve, wherein a release of the brakes can be detected by a pressure value in this pressure path falling below a characteristic pressure value.

When both conditions—service brake released and hill start assistant and/or creep suppression function activated simultaneously—are fulfilled, the at least one ABS pressure control valve and the at least one TCS valve are switched to positions in which the TCS valve connects the at least one ABS pressure control valve on the input side with the pressure medium store in order to maintain the last brake pressure applied in the brake cylinder allocated to the respective ABS pressure control valve.

More details are given in the description below of an embodiment example.

Am embodiment example of the invention is outlined below and explained in more detail in the description which follows.

DETAILED DESCRIPTION

Figure 1:
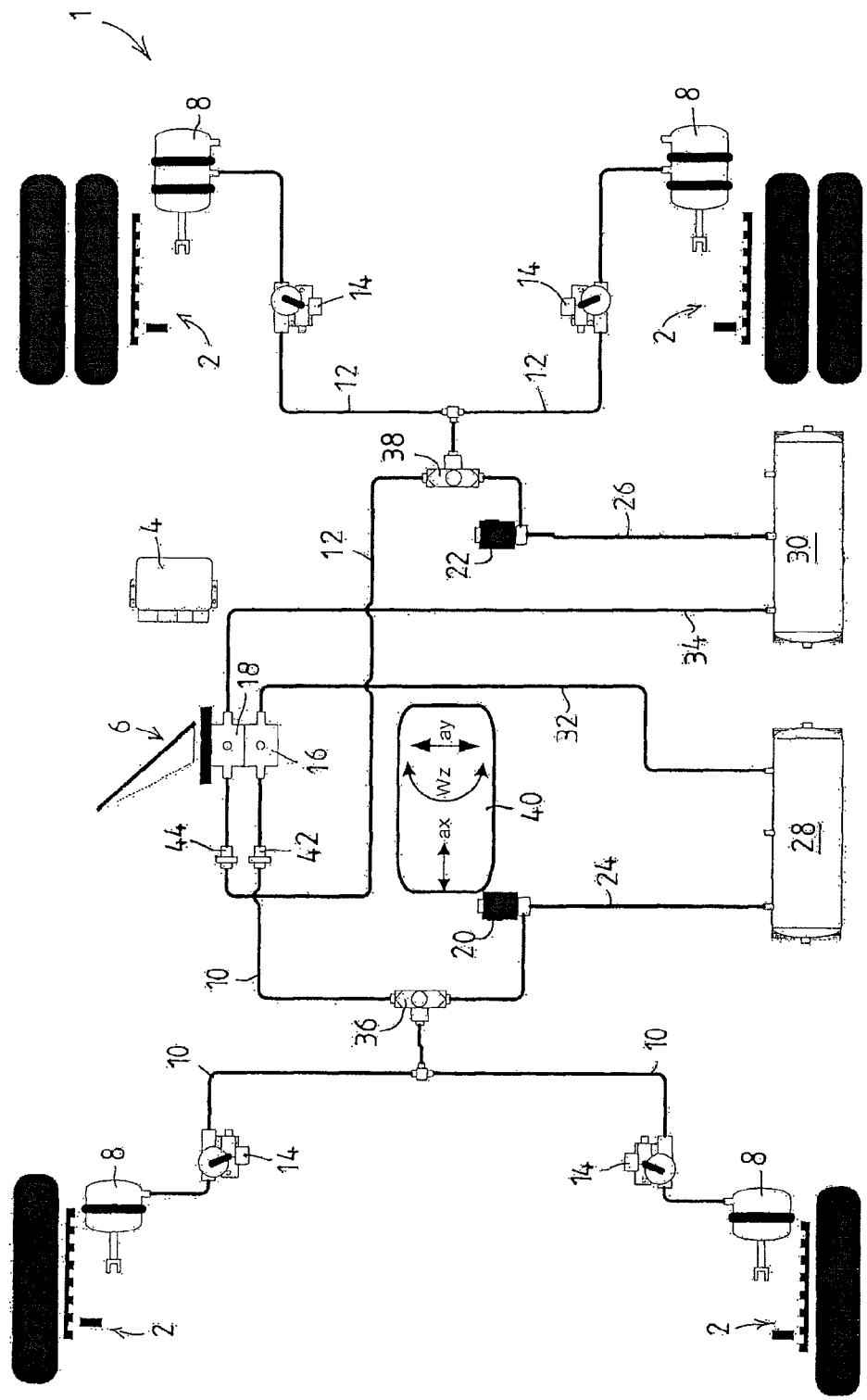
FIG. 1 shows a schematic circuit diagram of a pneumatic brake device of a truck according to an exemplary embodiment of the invention.

The pneumatic brake device 1 shown in the form of a schematic circuit diagram in FIG. 1 is a conventional brake device without brake pressure control but with brake slip control (ABS) for driver-independent control of the brake slip during a braking process, and with traction control (TCS) for driver-independent control of the drive slip during an acceleration process.

A wheel rotation speed sensor 2 is allocated to each wheel so that a brake controller unit 4 receives information on the respective wheel rotation behavior in order firstly to be able to regulate the brake slip and the drive slip as part of ABS and TCS.

As part of the brake slip control (ABS), on each vehicle side and for the wheels of a front axle and the wheels of a rear axle, at least one ABS pressure control valve 14 controlled by the brake controller unit is connected in pressure lines 10, 12 running between a service brake valve 6, which can be operated by the driver, and at least one brake cylinder 8 allocated to each wheel, to increase, maintain and reduce the pressure in the allocated brake cylinder 8. These pressure lines 10, 12 each extend, with a portion starting from a pneumatic front axle channel 16 and a pneumatic rear axle channel 18 of the service brake valve 6, to an input of a changeover valve 36, 38, the output of which is connected with the respective ABS pressure control valve 14 via the other portion of the pressure lines 10, 12. The other input of the changeover valves 36, 38 is connected in each case with a TCS valve 20, 22 which on the input side is in flow connection via a storage pressure line 24, 26 with a compressed air store 28, 30 for the front axle and rear axle respectively. Furthermore the compressed air stores 28, 30 are connected via storage pressure lines 32, 34 with the respective channel 16, 18 of the service brake valve 6.

The construction of such ABS pressure control valves 14 as membrane valves pre-controlled by solenoid valves is well known. They serve to increase, maintain and reduce the pressure as part of the ABS and TCS function to regulate the wheel slip to a permitted or optimum slip in the known manner. Therefore the function of such ABS pressure control valves 14 is not discussed in more detail here.

Similarly, TCS valves 20 are sufficiently well known which as part of traction control (TCS) create a compressed air connection between the respective pressure medium store 28, and the ABS pressure control valves 14 in order, for example by cycling of the ABS pressure control valves 14, to generate a brake pressure in the brake cylinders 8 of the wheels which are slipping undesirably, which pressure then automatically brakes these to a permitted or optimum drive slip without the intervention of the driver. The TCS valves 20, 22 may each be formed as 3/2-way solenoid valves, wherein these in a blocked position block the storage pressure from the input of the respective changeover valve 36, 38 and connect this with a purge, and in a passage position switch the storage pressure of the respective compressed air store 28, 30 to the input of the changeover valve 36, 38.

The brake device 1 also has a hill start assistant and/or creep suppression function controlled by control routines, as part of which function the brake pressure generated by the driver during a preceding braking in the brake cylinders 8 of the vehicle, on a detected stoppage of the vehicle on a hill or a detected creep of the vehicle, is maintained in the brake cylinders 8 without the driver having to activate the brake further. This retention of the brake pressure in the brake cylinders 8 may take place until a start-up process initiated by the driver is detected.

More precisely, it is provided that the control routines of the hill start assistant and creep suppression function are implemented in the brake controller unit 4 which otherwise controls at least the service brake function and also the ABS and TCS functions. Furthermore the brake controller unit 4 is adapted such that to implement the hill start assistant or creep suppression function, it controls exclusively the ABS pressure control valves 14 and the TCS valves 20, 22, as will be explained in more detail below.

Furthermore a longitudinal acceleration sensor 40 is provided which emits the respective longitudinal acceleration $a_x$ of the vehicle as a longitudinal acceleration signal and the transverse acceleration $a_y$ to the brake controller unit 4. Also a pressure sensor 42, 44 is connected in the pressure lines 10, 12 between the front axle channel 16 and the rear axle channel 18 of the service brake valve 6 and the respective changeover valve 36, 38, which reports the control pressure or brake pressure generated depending on the driver's request to the brake controller unit 4.

In this context the function of the brake device 1 controlled by the brake controller 4 is as follows:

As part of a service braking without ABS or TCS function activated, the service brake valve 6 creates a control pressure in the front axle channel 16 or rear axle channel 18 which is set at the input of the respective changeover valve 36, 38. Since at the other input of the changeover valve 36, 38 there is no storage pressure present from the compressed air stores 28, 30 because of the deactivated TCS function and hence the TCS valves 20, 22 switched to their blocked position, then the greater control pressure of the service brake valve 6 is set as a brake pressure in the pneumatic brake cylinder 8 by the ABS pressure control valves 14 which are then switched to passage, in order to provoke a service braking.

If during a service braking the brake slip at one or more wheels exceeds a permitted or optimum brake slip which is established via the wheel rotation speed signals from the wheel rotation speed sensors 2, the ABS pressure control valves 14 of the wheels concerned are controlled by the brake controller unit 4 in the sense of increasing, maintaining or reducing the pressure, in order to regulate the brake slip to a permitted or optimum brake slip. At the same time the TCS valves 20, 22 are switched to their blocked position to prevent the control pressure, which is generated in the front axle channel 16 and rear axle channel 18 depending on the driver's request, from being overruled by the respective storage pressure at the changeover valves 36, 38.

If on an acceleration process of one or more wheels of an axle, an unacceptable or excessive drive slip is found, which can also be established from the wheel rotation speed signals of the wheel rotation speed sensors 2, the TCS valve 36, 38 on the axle concerned is switched to the passage position in order to switch the storage pressure from the respective compressed air store 28, 30 to the input of the respective changeover valve 36, 38. If at the other input of the changeover valve 36, 38, no higher control pressure is present which is set by the service brake valve 6 depending on the driver's request, the storage pressure at the ABS pressure control valve 14 is passed to the wheels with drive slip and for example modulates these by cycling the storage pressure so that the desired nominal drive slip occurs at the wheels concerned.

For the case that the vehicle has been braked to a stop by the driver with a specific brake pressure or control pressure via the service brake valve, and the operating mode "hill start assistant and/or creep suppression function" has been activated and the driver has then released the brake, by the brake controller unit 4 all ABS pressure control valves 14 may be switched to the pressure-retention position and the TCS valves 20, 22 are switched to the passage position. According to a further embodiment also only selected ABS pressure control valves 14 and only the allocated TCS valve 20, 22 are switched in this manner.

Then because the ABS pressure control valves 14 even in the pressure-retention position cannot maintain the brake pressure in the brake cylinders 8 for a long period, a further supply of compressed air from the compressed air stores 28, 30 is required so that the last, greatest service brake pressure generated at the driver's request can be maintained in the brake cylinders 8 in order to keep the vehicle braked.

In particular the operating mode "hill start assistant" is activated automatically by the brake controller unit 4 for example when the longitudinal acceleration signal from the longitudinal acceleration sensor 40 exceeds a lower limit value and signals which represent a stoppage of the vehicle are still being sent to the brake controller unit 4. When the longitudinal acceleration $a_x$ measured exceeds such a lower limit value during a stoppage, this indicates that the vehicle has been braked to a stop on an uphill or downhill slope, because then a longitudinal acceleration $a_x$ is detectable which constitutes a component of gravity g which provokes the downward slip force acting on the vehicle.

The stoppage of the vehicle is detected by signals from the wheel rotation speed sensors 2. A released brake can be detected by the pressure sensors 42, 44 when a control pressure falls below a characteristic pressure value in the pressure lines 10, 12.

Figure 2:
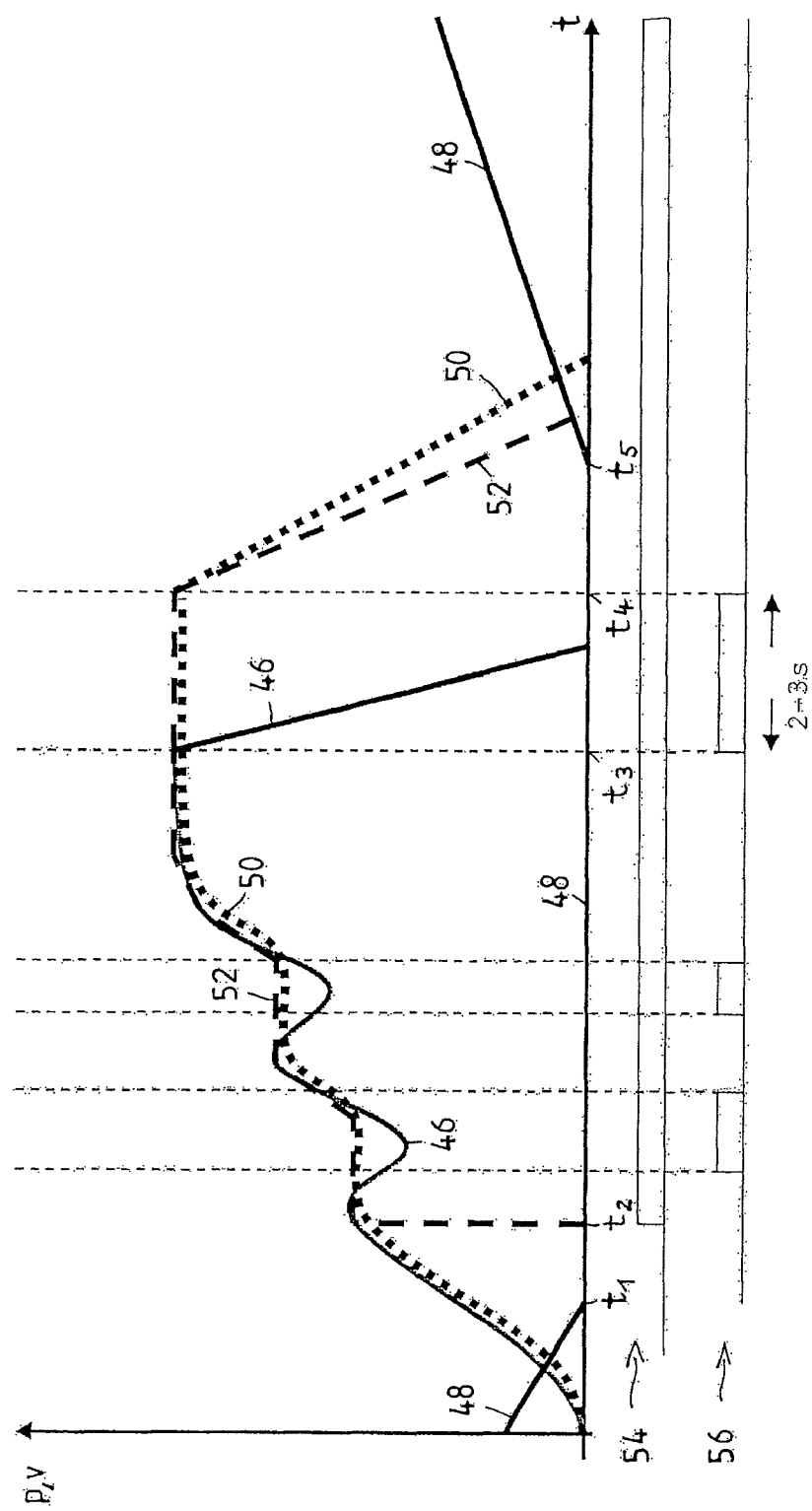
FIG. 2 shows a diagram which indicates amongst others the brake pressure and vehicle speed over time during a braking of the vehicle to a stop.

The method which is executed as part of the "hill start assistant" function by the control routines stored in the brake controller unit 4 will now be explained below with reference to a concrete example. The diagram in FIG. 2 shows the development of the brake pressure 46 emitted by the brake valve 6 (solid line), the development of the travel speed 48 (solid line) and the development of the pressure 50 generated as part of the "hill start assistant" function (dotted line) in the brake cylinders. Furthermore the development of the brake pressure 52 (dashed line) is shown which occurs when, in the manner of a drag pointer, the last greatest brake pressure generated by the driver's request is maintained or "carried" until the brake pressure generated at the driver's request assumes an even higher value.

At the start (t=0) there is still a certain vehicle speed 48 although already a degree of brake pressure 46 generated by the driver is present, but the gradient is negative (deceleration). At time $t_1$, stoppage exists. Slightly later, at time $t_2$, the longitudinal acceleration sensor 40, despite the detected stoppage, measures a characteristic longitudinal acceleration $a_x$ which indicates the presence of an incline. The signal from the longitudinal acceleration sensor 40 is shown in simplified form in the lower diagram 54 in FIG. 2.

Because a detected stoppage and a characteristic longitudinal acceleration $a_x$ present in this state indicate a braking of the vehicle on an incline, the "hill start assistant" function is activated by the brake controller unit 4 at time $t_2$.

The activated "hill start assistant" function now ensures that even during the stoppage, the last greatest brake pressure value 52 generated by the driver is stored in a memory of the brake controller unit 4, as indicated by the curve drawn in dashed lines in FIG. 2. In the present case the driver has therefore twice reduced the brake pressure generated by the service brake valve 6 but the last highest or greatest brake pressure value is stored. The temporal periods for which the last highest brake pressure value concerned is stored are illustrated in the bottom diagram 56 in FIG. 2.

At time $t_3$ the driver releases the brakes, whereby the last brake pressure value 52 generated by him and stored is maintained in the brake cylinders 8 by the switching of the ABS pressure control valves 14 and TCS valves 20, 22 described above, as indicated by the curve 50, drawn in dotted lines, of the brake pressure generated now as part of the "hill start assistant" function.

This last highest brake pressure value generated by the driver at time $t_3$ on or before release of the brake may now be maintained in the brake cylinders for a predefined period e.g. for some seconds. After expiry of this predefined period or when, as seen here at time $t_4$, it is found that a drive moment is present which is sufficient for a start-up process of a drive machine of the vehicle, the brake pressure is lowered by switching the ABS pressure control valves 14 to pressure fall and the TCS valves 20, 22 to their blocked position so that the vehicle speed 48 rises again from time $t_5$. Between times $t_1$ and $t_5$, the vehicle speed is zero (stoppage).

Because of the changeover valves 36, 38 however it is always guaranteed that a brake pressure corresponding to the driver's request, which is higher than the last highest brake pressure during the period of automatically maintained braking i.e. between times $t_3$ and $t_4$, always takes priority. This is because the changeover valves 36, 38 pass this then higher driver-dependent brake pressure to the brake cylinders 8, as can easily be seen from FIG. 1.

The working medium of the brake device can be any pressure medium i.e. also hydraulic fluid instead of air. In this case the pneumatic brake cylinders 8 are replaced by brake actuators compatible with a hydraulic system.

THE LIST OF REFERENCE NUMERALS IS AS FOLLOWS

1 Brake device
2 Wheel rotation speed sensor
4 Brake controller unit
6 Service brake valve
8 Brake cylinder
10 Pressure line
12 Pressure line
14 ABS pressure control valve
16 Front axle channel
18 Rear axle channel
20 TCS valve
22 TCS valve
24 Storage pressure line
26 Storage pressure line
28 Store
30 Store
32 Storage pressure line
34 Storage pressure line
36 Changeover valve
38 Changeover valve
40 Longitudinal acceleration sensor
42 Pressure sensor
44 Pressure sensor
46 Brake pressure dependent on driver's request
48 Vehicle speed
50 Brake cylinder pressure
52 Stored brake pressure values
54 Diagram
56 Diagram

The invention claimed is:

1. A pressure-medium-activated brake device of a vehicle, comprising:
a brake slip control (ABS) for driver-independent control of a brake slip during a braking process; and
a traction control (TCS) for driver-independent control of a drive slip during an acceleration process;
wherein as part of the brake slip control (ABS), there is at least one ABS pressure control valve controlled by a brake controller unit that is connected in pressure lines running between a service brake valve and at least one brake cylinder to increase, maintain and reduce a pressure in an allocated brake cylinder,
wherein as part of the traction control, there is at least one TCS valve controlled by the brake controller unit to create a compressed air connection between a pressure medium store and the at least one ABS pressure control valve,
wherein at least one of a hill start assistant and a creep suppression function is controlled by control routines, as part of which function a brake pressure generated by a driver during a preceding braking in at least some brake cylinders of the vehicle, on a detected stoppage of the vehicle on a hill or a detected creep of the vehicle, is at least maintained in the at least one brake cylinder without the driver having to activate a brake further,
wherein all control routines of the at least one of the hill start assistant and the creep suppression function are implemented in the brake controller unit, which brake controller unit is configured to implement the at least one of the hill start assistant and the creep suppression function, and wherein the brake controller unit controls exclusively the at least one ABS pressure control valve and the at least one TCS valve,
wherein there is at least one changeover valve which on an input side is connected to the at least one TCS valve and to a channel of the service brake valve and on an output side to at least one ABS pressure control valve to be able to transfer to an output of the at least one ABS pressure control valve a res respective greater pressure at two inputs of the at least one ABS pressure control valve, and
wherein the at least one changeover valve ensures that a brake pressure corresponding to a driver's brake pressure request, which is higher than a last highest brake pressure during a period of automatically maintained braking always takes priority, since the at least one changeover valve passes a higher driver-dependent brake pressure to at least one of the brake cylinders.

2. The brake device of claim 1, wherein, with the brakes released, in the case of an activated operating mode for at least one of a hill start assistant and a creep suppression function, the at least one ABS pressure control valve and the TCS valve are controlled by the brake controller unit such that the at least one ABS pressure control valve is switched to a pressure-retention position in which a greatest brake pressure generated by the preceding braking in the at least one brake cylinder is maintained, and the at least one TCS valve is switched to a position in which the at least one TCS valve connects the at least one ABS pressure control valve on an input side with the pressure medium store.

3. The brake device of claim 2, wherein there is at least one longitudinal acceleration sensor which emits longitudinal acceleration signals to the brake controller unit, and wherein an operating mode of the at least one of the hill start assistant and the creep suppression function is activated by the brake controller unit when the longitudinal acceleration measured exceeds a lower limit value and signals which represent a stoppage of the vehicle are still being sent to the brake controller unit.

4. The brake device of claim 3, wherein the stoppage of the vehicle can be detected by signals from wheel rotation speed sensors allocated to at least one of an ABS function and an TCS function.

5. The brake device of claim 2, wherein at least one pressure sensor is connected in a pressure path between the service brake valve and the at least one ABS pressure control valve, and wherein a release of the brakes can be detected by a pressure value in this pressure path falling below a characteristic pressure value.

6. The brake device of claim 1, wherein the at least one ABS pressure control valve contains at least one membrane valve precontrolled by a solenoid valve.

7. The brake device of claim 1, wherein the at least one TCS valve contains at least one 3/2-way solenoid valve.

* * * * *